United States Patent [19]

Okoshi

[11] Patent Number: 4,554,841
[45] Date of Patent: Nov. 26, 1985

[54] SPEED CONTROL DEVICE OF A TORIC TYPE INFINITELY VARIABLE TRANSMISSION

[75] Inventor: Hideo Okoshi, Fujisawa, Japan

[73] Assignee: Nippon Seiko Kabushiki Kaisha, Tokyo, Japan

[21] Appl. No.: 548,834

[22] Filed: Nov. 4, 1983

[51] Int. Cl.⁴ ............................................. F16H 15/08
[52] U.S. Cl. ......................................... 74/200; 74/190
[58] Field of Search ................. 74/190, 199, 200, 201, 74/207, 211, 213

[56] References Cited

U.S. PATENT DOCUMENTS

| | | | |
|---|---|---|---|
| 2,086,491 | 7/1937 | Dodge | 74/285 |
| 3,008,337 | 11/1961 | Kraus | 74/200 |
| 3,087,348 | 4/1963 | Kraus | 74/200 |
| 3,142,189 | 7/1964 | Davis et al. | 74/200 |
| 3,159,042 | 12/1964 | Kraus | 74/200 |
| 3,570,317 | 3/1971 | Kraus | 74/200 |
| 3,810,398 | 5/1974 | Kraus | 74/200 |
| 4,086,820 | 5/1978 | Kraus et al. | 74/200 |
| 4,275,610 | 6/1981 | Kraus | 74/200 |
| 4,434,676 | 3/1984 | Horton | 74/200 |
| 4,453,427 | 6/1984 | Kraus et al. | 74/200 |

Primary Examiner—Stephen F. Husar
Attorney, Agent, or Firm—Shapiro and Shapiro

[57] ABSTRACT

A speed control device of a toric type infinitely variable transmission having a housing, an input and an output shaft rotatably and coaxially supported by the housing, an input and an output disc fitted on the input and output shafts, respectively, and engaged with the shafts for rotation therewith, the opposed surfaces of the discs cooperating with each other to form a toroidal cavity, left and right traction rollers disposed in the toroidal cavity symmetrically with respect to the axis of the input and output shafts, trunnion devices rotatably supporting the traction rollers and supported by the housing for rotation about pivot axes perpendicular to the axes of rotation of the traction rollers, and pressing means for urging the input and output discs on the traction rollers into engagement with each other and causing a traction force is characterized by a support device for supporting respectively pivot shaft ends so that the pivot shafts of the left and right trunnion devices are slightly tiltable, and a tilting device for slightly moving the support device to left and right and tilting the trunnion devices by a predetermined amount. The support devices include a support link member for connecting the upper and lower pivot shaft ends of each of the left and right trunnion devices using bearing means. The support link members are supported in the housing for slight leftward and rightward movement.

10 Claims, 8 Drawing Figures

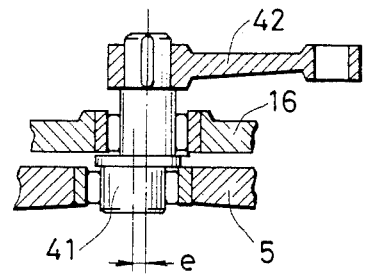
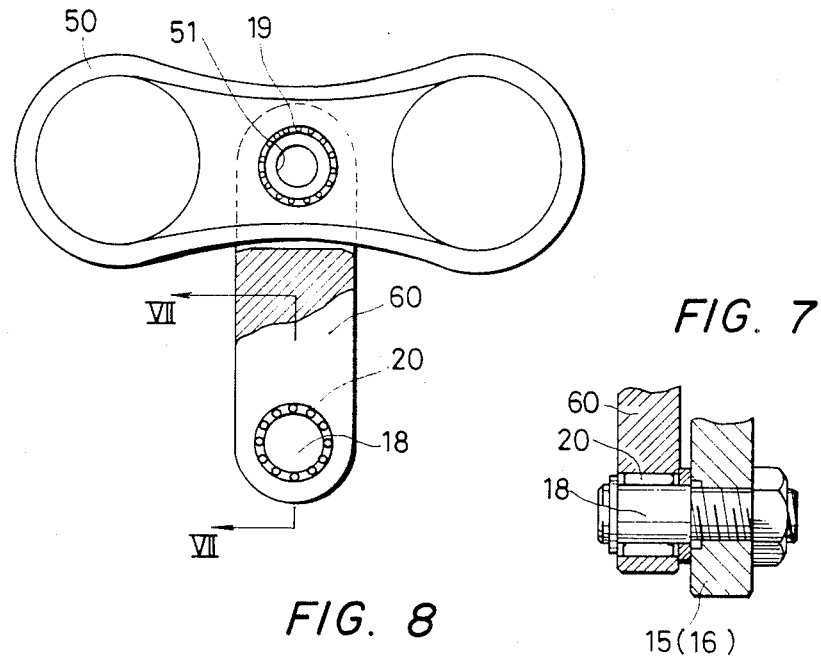
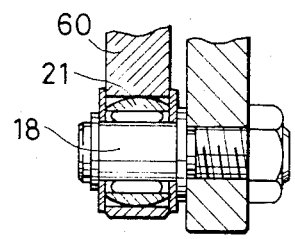

SPEED CONTROL DEVICE OF A TORIC TYPE INFINITELY VARIABLE TRANSMISSION

BACKGROUND OF THE INVENTION

1. Field of the Invention

This invention relates to a speed control device of a toric type infinitely variable transmission in which the opposed surfaces of an input disc and an output disc provided on an input shaft and an output shaft, respectively, disposed on the same axis cooperate with each other to form a toroidal cavity and traction rollers are disposed in the toroidal cavity and engaged with the input and output discs and a large torque is transmitted by a traction force produced in the engaged portion, and intends to provide a speed control device which is capable of effecting control of the transmission ratio of acceleration and/or deceleration by a small operating force and which is simple in structure and excellent in durability and moreover inexpensive.

2. Description of the Prior Art

The toric type infinitely variable transmission as described above is known and various speed control device thereof have heretofore been devised. For example, in the toric type infinitely variable transmissions disclosed in U.S. Pat. Nos. 3,087,348; 3,142,189; 3,159,042; 4,086,820; and 4,275,610, a hydraulic cylinder device is provided for each of the traction rollers and the traction rollers are moved by a small amount in the direction of the pivot axis thereof, and in the toric type infinitely variable transmissions disclosed in U.S. Pat. Nos. 3,008,337 and 3,570,317, the pivot shafts of the traction rollers are tilted by a hydraulic cylinder, and in all of these transmissions, self speed controlling action is performed to effect transmission ratio change. Also, as a toric type infinitely variable transmission using no hydraulic device, there is one disclosed in U.S. Pat. No. 2,086,491. This transmission uses not oil pressure but a screw device or a gear device to directly rotate a trunnion about the pivot shaft thereof and does not perform the self speed changing action and therefore requires a large transmission ratio change operating force.

Generally, in the toric type infinitely variable transmission, it is known that when the axis of rotation of traction rollers and the axis of rotation of input and output discs are not aligned with each other, that is, when the trunnion devices which rotatably support the traction rollers are moved by a small amount in the direction of the pivot axis thereof and/or when the pivot shaft is tilted, rotation of the traction rollers about the pivot axis thereof results from the self transmission ratio changing action and the radii of the engaging circles of the traction rollers and the input and output discs are varied, that is, the transmission ratio is varied.

SUMMARY OF THE INVENTION

According to the present invention, a support member supporting the respective pivot shafts of left and right trunnion devices for tilting movement by a small amount in the same direction is moved to left and right by a small amount by a manual or hydraulic cylinder device and the left and right trunnions are tilted in the same direction at a time to perform the self transmission ratio changing action and thereby effect transmission ratio change.

The invention will become more fully apparent from the following detailed description thereof taken in conjunction with the accompanying drawings.

BRIEF DESCRIPTION OF THE DRAWINGS

FIG. 3 is a cross-sectional view illustrating another embodiment of the speed control lever.

FIG. 6 is a plan view showing a support link member supported by the use of a pivotable link member.

FIG. 7 is a cross-sectional view taken along line VII—VII of FIG. 6.

FIG. 8 is a fragmentary cross-sectional view showing another embodiment in which the pivotable link member is supported on a strut by the use of a spherically configured bearing 21.

DESCRIPTION OF THE PREFERRED EMBODIMENTS

Preferred embodiments of the present invention will hereinafter be described by reference to the drawings.

Figure 1:
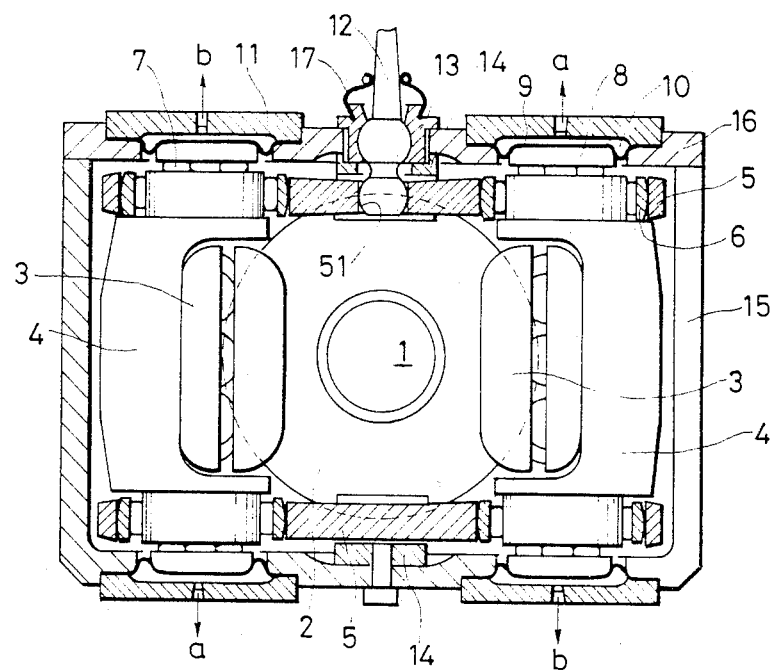
FIG. 1 is a transverse sectional view illustrating a toric type infinitely variable transmission having mounted thereon a speed control device using a speed control lever which is an embodiment of the present invention.

Referring to FIG. 1 which is a transverse sectional view of a toric type infinitely variable transmission operated by a speed control lever, an input disc 2 is fitted on an input shaft 1 shown as an end surface and is engaged by an engaging member, not shown, for rotation with the latter, as is well known. Although not shown, an output shaft and an output disc are likewise provided on this side of the Figure.

Figure 2:
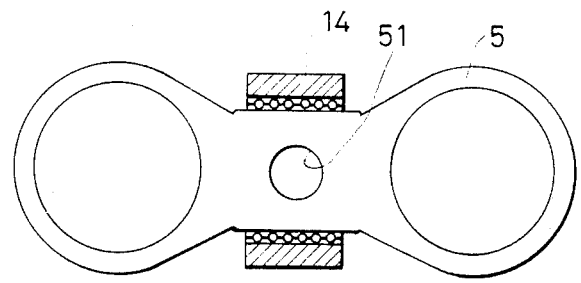
FIG. 2 is a plan view illustrating a support link member and a linear motion antifriction bearing supporting it.

In a toroidal cavity defined by the input disc 2 and said output disc, left and right traction rollers 3 are rotatably supported by trunnions 4 and urged against and engaged with the input and output discs. The upper and lower pivot shaft ends of each trunnion 4 are held by support link members 5, respectively, using spherically configured bearings 6, and as clearly shown in FIG. 2, each of the support link members 5 is mounted on a housing 15 and a housing lid 16 using a linear motion antifriction bearing 14 for leftward and rightward movement.

A reaction piston 8 extends at each pivot shaft end of each trunnion 4 through a thrust bearing 7, the back of the reaction piston 8 is covered with a bellophragm 9 whose marginal portion is closely secured to the housing 15 or the housing lid 16 by an end cover 11, and a reaction chamber 10 is formed in the cavity between the end cover 11 and the bellophragm 9. The end cover 11 is provided with a piping port a or b as shown, and a,a and b,b on the diagonals are communicated with each other by piping, not shown. Each reaction chamber 10 and the piping are filled with non-compressive fluid such as hydraulic operating oil.

An opening 51 is formed at the center of the support link members 5 and the tip end of a speed control lever 12 is inserted in said opening 51. The speed control lever 12 is supported in the housing lid 16 for leftward and rightward pivotal movement through a spherical seat 13. Designated by 17 is a boot.

In the embodiment of the present invention having the above-described construction, when the speed control lever 12 is operated manually or by other well-known means to move the support link members 5 leftward and rightward, the left and right trunnions 4, 4 tilt about the pivot axes and therefore, the conformity of the rotational axis of the traction rollers to the rotational axis of the input and output discs is destroyed and the self transmission ratio changing action occurs, and the traction rollers 3 and 3 rotate about the pivot axes thereof while maintaining their secure engagement with the input and output discs. The direction of rotation is the direction of acceleration or deceleration depending on the direction of leftward or rightward movement of the support link members 5. If, when a desired acceleration or deceleration ratio has been obtained, the speed control lever 12 is operated to return the support links to its original position so that the rotational axis of the traction roller 3 is coincident with the rotational axis of the input and output discs in the same plane, said rotation terminates and thus, there is obtained a transmission ratio corresponding to the ratio of the radii of the engaged circles in that state.

The speed control lever 12 is not restricted to the pivotable type shown, but may also be the rotatable type having an eccentric cam 41 (having an amount of eccentricity e) and a lever 42 as shown in FIG. 3.

Also, in this embodiment, the reaction chambers 10 and the pipings are filled with non-compressive fluid as previously described and therefore, the positions of the left and right trunnions 4 and 4 in the directions of the pivot axes thereof become balanced so that the traction forces of the left and right traction rollers 3 and 3 are equal to each other and thus, it is not necessary to effect precise alignment in advance.

Figure 4:
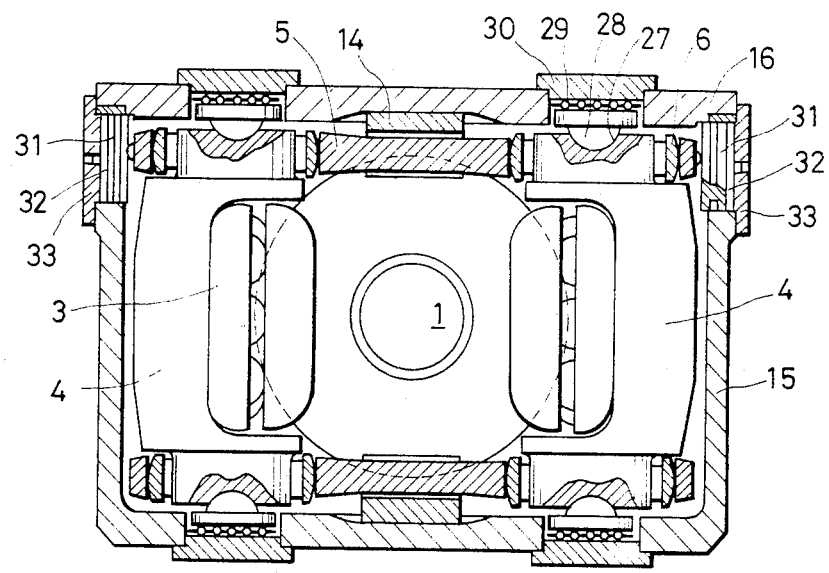
FIG. 4 is a transverse sectional view similar to FIG. 1 but illustrating a toric type infinitely variable transmission having mounted thereon a speed control device using a hydraulic cylinder device in accordance with another embodiment of the present invention.
Figure 5:
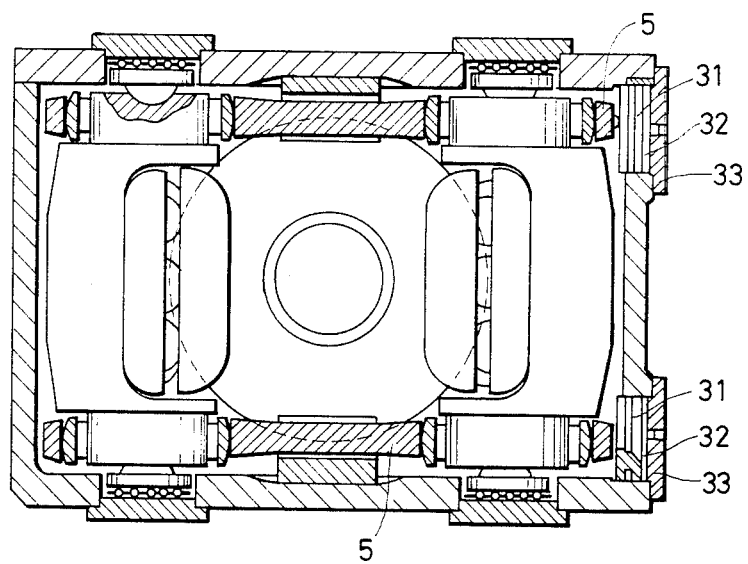
FIG. 5 is a transverse sectional view showing a toric type infinitely variable transmission using a hydraulic cylinder device in accordance with still another embodiment of the present invention.

Further embodiments shown in FIGS. 4 and 5 will now be described. In these embodiments, unlike the operation by the aforedescribed speed control lever, the support link members are moved to left and right by a hydraulic cylinder device and, as in the embodiment of FIG. 1, the left and right trunnion devices are tilted by a predetermined amount in the same direction to cause the self transmission ratio changing action to occur and thereof change the transmission ratio into a predetermined transmission ratio. In the embodiment shown in FIG. 4, the hydraulic cylinder devices extend at the opposite ends of one support link member 5 (in the Figure, the upper support link member 5) and, in the embodiment shown in FIG. 5, the hydraulic cylinder device extends at one end of each of the upper and lower support link members 5 and 5. In these embodiments, the reaction piston 8, the bellophragm 9 and the reaction chamber 10 in the embodiment of FIG. 1 are not mounted, but the pivot shaft ends of the trunnion devices are supported by spherical seats and linear motion bearings.

In the other points, the constructions of these embodiments are similar to the construction of the FIG. 1 embodiment. The differences of these embodiments from the FIG. 1 embodiment will hereinafter be described in more detail. Reference numeral 27 designates spherical seats formed at the pivot shaft ends of the trunnions 4. A spherical pivot 28 fitted on each of the spherical seats 27 extends and rolling elements 29 are interposed between the back of the spherical pivot 28 and a lid 30 to thereby constitute a linear motion bearing.

On the other hand, pistons 31 are secured to the ends of each support link member 5, and a hydraulic pressure is supplied to a chamber 32 formed between the back of each piston 31 and a lid 33, thereby pushing the pistons 31 to move the support link members 5 to the left (or to the right). At this time, by the action of the spherical seats 27 or the linear motion bearings and the spherically configured bearings 6, the left and right trunnions 4 and 4 are very smoothly tilted about the pivot axes thereof and as previously described, the transmission ratio can be varied by the self transmission ratio changing action.

In these embodiments, the hydraulic cylinder devices have been shown as being of the single-acting piston type, but it will be easily understood that it is possible to incorporate double-acting piston type hydraulic cylinder devices and it is also possible to form the shaft ends of the trunnions 4 into spherical pivots.

Now, in the embodiments of FIGS. 1 to 5, the support link members 5 have been shown as being mounted on the housing 15 and the housing lid 16 using linear motion antifriction bearings 14 for leftward and rightward movement, but alternatively, as shown in FIGS, 6 and 7, the central portion of a support link member 50 may be connected to one end of a pivotable link member 60 using a bearing 19 and the other end of the pivotable link member 60 may be pivotably supported on a strut 18 studded in the housing 15 (or the housing lid 16), using a bearing 20. As a further alternative, as shown in FIG. 8, the pivotable link member 60 may be supported relative to the strut 18 using a spherically configured bearing 21.

In the embodiments of FIGS. 6 to 8, the force for moving the support link member 50 to left and right may be smaller than in the embodiment of FIGS. 1 to 5 wherein the support link members 5 are directly supported by the linear motion antifriction bearings 14.

As described above in detail, the present invention provides a transmission which incorporates novel originalities in the structures of the various portions thereof and can accomplish reliable and smooth transmission ratio change with a small operating force by utilizing the self transmission ratio changing action of a toric type infinitely variable transmission which has recently been attracting attention and developed by the reason that it can accomplish continuous transmission ratio change steplessly, that it has a wide transmission ratio range, that it can be made compact and sturdy and that it is of the fuel-saving type particularly suitable for use in automotive vehicles. The present invention is very effective to put the toric type infinitely variable transmission into practical use in that in a small vehicle having no hydraulic source, it enables an engine suction negative pressure to be used as the source of speed change operating force, that in a still smaller vehicle, manual or foot pedal operation is also possible and that centrifugal force can be utilized for the auxiliary instruments of a vehicle.

I claim:

1. A speed control device of a toric type infinitely variable transmission having a housing, an input and an output shaft rotatably and coaxially supported by said housing, an input and an output disc fitted on said input and output shafts, respectively, and engaged with said shafts for rotation therewith, the opposed surfaces of said discs cooperating with each other to form a toroidal cavity, left and right traction rollers disposed in said toroidal cavity symmetrically with respect to the axis of said input and output shafts, trunnion devices rotatably supporting said traction rollers and supported by said housing for rotation about pivot axes perpendicular to the axes of rotation of said traction rollers, and pressing means for urging said input and output discs on said traction rollers into engagement with each other and causing a traction force, characterized by a support device for supporting respective pivot shaft ends so that the pivot shafts of said left and right trunnion devices are slightly tiltable, and a tilting device for slightly moving said support device leftward and rightward and tilting said trunnion devices by a predetermined amount, said support devices including a support link member for connecting the upper and lower pivot shaft ends of each of said left and right trunnion devices using bearing means, said support link members being supported in said housing for slight leftward and rightward movement.

2. A speed control device according to claim 1, wherein each of said support link members has its substantially central portion supported in said housing by a linear motion bearing for leftward and rightward movement.

3. A speed control device according to claim 1, wherein the central portion of said support link members is connected to one end of a pivotable link member and the other end of said pivotable link member is pivotably supported by said housing.

4. A speed control device according to claim 1, wherein a speed control lever is supported for transmission ratio changing operation on said housing or a housing lid and the tip end of said speed control lever is inserted in any of the upper and lower support link members of said support device.

5. A speed control device according to claim 1, wherein to move any of the upper and lower support link members of said support device leftward and rightward, single-acting piston type hydraulic cylinder devices are provided extending at the opposite ends of said support link member.

6. A speed control device according to claim 1, wherein to move the upper and lower support link members of said support device leftward and rightward, a single-acting piston type hydraulic cylinder device is provided extending at one end of each of said support link members.

7. A speed control device according to claim 1, wherein to move any of the upper and lower support link members of said support device leftward and rightward, double-acting piston type hydraulic cylinder device is provided extending at one end of said link member.

8. A speed control device according to claim 1, wherein a reaction piston extends at each pivot shaft end of each of said trunnion devices using a thrust bearing, reaction chambers are formed between said pistons and said housing by bellophragms seated on the back of said reaction pistons, two of said reaction chambers on the diagonals thereof are communicated with each other by piping, and said reaction chambers and said piping are filled with non-compressive fluid.

9. A speed contorl device according to claim 1, wherein a spherical thrust seat is formed at each pivot shaft end of each of said trunnion devices, a spherical pivot fitted to said spherical seat is supported by said housing using a linear motion bearing.

10. A speed control device according to claim 1, wherein a spherical pivot is formed at each pivot shaft end of each of said trunnions, and a spherical thrust seat fitted to said spherical pivot is supported by said housing using a linear motion bearing.

* * * * *